UNITED STATES PATENT OFFICE.

HIRAM M. HANMORE, OF LOS ANGELES, CALIFORNIA.

COMPOSITION FOR PLASTER FOR WALLS, CEILINGS, &c.

SPECIFICATION forming part of Letters Patent No. 720,799, dated February 17, 1903.

Application filed October 28, 1902. Serial No. 129,095. (No specimens.)

*To all whom it may concern:*

Be it known that I, HIRAM M. HANMORE, a citizen of the United States, and a resident of Los Angeles, in the county of Los Angeles and State of California, have invented a new and useful Composition for Plaster for Walls, Ceilings, and other Parts of Buildings and other Structures, of which the following is a specification.

This composition consists of diatomaceous earth, calcic oxid, kaolin, and animal, vegetable, or mineral fiber. The proportions of these several ingredients may be varied to some extent without materially changing the character of the composition; but the proportions which I prefer are as follows, by weight: diatomaceous earth, fifty parts; calcic oxid, thirty parts; kaolin, ten parts, and fiber, ten parts.

The composition is made in the following manner: The diatomaceous earth, calcic oxid, and the kaolin are ground to powder and, with the fiber, are placed in any suitable mixing apparatus, by which they are intimately mixed together. All that is necessary to make this mixture into plaster is the addition of water in quantity sufficient to give the mass a proper plastic consistency, which is to be determined by the plasterer who uses it.

The composition is to be kept in a dry state until required for use. It may be shipped in sacks for transportation and market.

Plaster made from this composition is very light as compared with other wall-plasters. It becomes very hard and strong.

I have hereinabove referred to the fiber which I use as animal, vegetable, or mineral. This is comparatively immaterial. The vegetable fiber known as "manila" is very suitable. This fiber may be cut into suitable short lengths to mix with the other ingredients. Its purpose is merely to prevent the plaster from "checking" while it is drying.

What I claim as my invention is—

A composition for wall-plaster consisting of diatomaceous earth, calcic oxid, kaolin and fiber substantially as herein described.

In testimony that I claim the foregoing as my invention I have signed my name, in presence of two witnesses, this 18th day of October, 1902.

HIRAM M. HANMORE.

Witnesses:
   GEO. B. HANNAMAN,
   GEO. POMEROY.